No. 728,381. PATENTED MAY 19, 1903.
M. EMMÉ.
STORAGE BATTERY.
APPLICATION FILED MAR. 11, 1902.
NO MODEL.
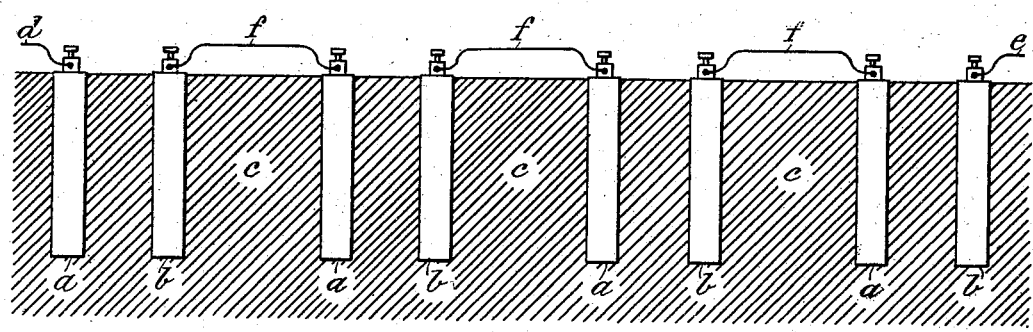
WITNESSES:
J. M. Howard
C. Sedgwick
INVENTOR
Mary Emmé,
BY
A. P. Thayer.
ATTORNEY No. 728,381. Patented May 19, 1903.

UNITED STATES PATENT OFFICE.

MARY EMMÉ, OF NEW YORK, N. Y., ASSIGNOR OF ONE-FOURTH TO SIGRID RINGHDAHL, OF CHICAGO, ILLINOIS.

STORAGE BATTERY.

SPECIFICATION forming part of Letters Patent No. 728,381, dated May 19, 1903.

Application filed March 11, 1902. Serial No. 97,694. (No model.)

*To all whom it may concern:*

Be it known that I, MARY EMMÉ, a citizen of the United States of America, and a resident of the borough of Manhattan, New York city, and State of New York, have invented certain new and useful Improvements in Storage Batteries, of which the following is a specification.

My invention relates to electrical storage batteries, the positive and negative electrodes being put down in the ground and the earth between the electrodes belonging to each cell moistened by a suitable chemical preparation, as hereinafter described, reference being made to the accompanying drawing, which represents a vertical section of a series of cells constructed according to my invention.

*a* represents the positive electrodes; *b*, the negative electrodes; *c*, the earth in which they are placed; *d* and *e*, the terminal wires, and *f* internal connecting-wires; but these latter may be used or not at will.

A desired number of cells can be put down at suitable distances apart in a piece of ground of suitable area to avoid the action of the earth as one continuous electrolyte between the end electrodes, the space between the electrodes of each cell being small compared to that between each cell. The cells thus constructed have the advantage of dispensing with vessels and insulating arrangements of ordinary storage batteries. They are charged and discharged in a way similar to other storage-battery cells.

What I claim as my invention is—

1. A storage-battery cell consisting of electrodes of suitable material, (for instance, lead electrodes prepared with peroxid of lead) put down in ground or earth of any kind, and a solution of suitable chemical material used as an electrolyte for exciting the electrodes.

2. A storage battery composed of cells consisting of suitable material, put down in ground or earth of any kind, and an electrolyte applied in any way to the thus embedded cells, said cells placed at a distance apart to neutralize the action of the earth as a continuous electrolyte.

3. A storage-battery cell consisting of one or more electrolytic substances of suitable chemical material applied to ground or earth of any kind, in which electrodes of suitable material are placed.

Signed at New York city this 8th day of March, 1902.

MARY EMMÉ.

Witnesses:
C. SEDGWICK,
J. M. HOWARD.